United States Patent Office 3,793,364
Patented Feb. 19, 1974

3,793,364
CARBOXYLATION OF ARYLACETONITRILES
Edwin L. Patmore, Fishkill, N.Y., assignor to
Texaco Inc., New York, N.Y.
No Drawing. Original application Dec. 18, 1968, Ser. No. 784,945, now Patent No. 3,591,628. Divided and this application Feb. 3, 1971, Ser. No. 119,429
Int. Cl. C07c *121/66*
U.S. Cl. 260—465 D    4 Claims

ABSTRACT OF THE DISCLOSURE

A method of carboxylating indene, cyclopentadiene, fluorene and hydrocarbyl cyanide by contacting said compounds with carbon dioxide under substantially anhydrous conditions in the presence of a guanidine of the formula:

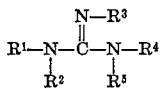

where $R^1$ through $R^5$ are hydrogen or alkyl of from 1 to 5 carbons and acidifying the resultant reaction mixture to form the carboxylic acid derivative and recovering said derivative therefrom.

---

This is a division of Ser. No. 784,945, filed Dec. 18, 1968, now U.S. Pat. No. 3,591,628.

BACKGROUND OF INVENTION

This invention is in the field of art relating to the preparation of a carboxylic acid compound derived from hydrocarbons and aralkyl cyanides.

In the past, the carboxylic acid derivatives of the reactants contemplated herein were prepared by employing very expensive bases such as sodium, naphthalene, sodamide, and lithium salts such as butyl lithium. The bases of the prior art being costly, rendered the process of preparing carboxylic acids of the type contemplated herein not practicable from a commercial point of view even though the carboxylic products were very useful as chemical intermediates for the preparation of barbituates, synthetic lube oil additives and other chemical compounds.

SUMMARY OF INVENTION

I have discovered and this constitutes my invention a carboxylation method of converting indene, cyclopentadiene, fluorene and alkaryl cyanide into carboxylic acid derivatives utilizing a relatively inexpensive base thereby resulting in a method which renders the production of carboxylic acids of the type contemplated herein commercially attractive. Specifically, the method comprises forming a carboxylic acid derivative of indene, cyclopentadiene, fluorene or aralkyl cyanide by contacting under substantially anhydrous conditions said compounds with carbon dioxide in the presence of a guanidine base of the formula:

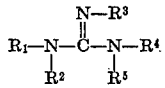

where $R^1$ through $R^5$ are hydrogen or alkyl of 1 to 5 carbons, subsequently acidifying the resultant reaction mixture and recovering the carboxylic acid derivative therefrom.

DETAILED DESCRIPTION OF THE INVENTION

Specifically, the method comprises forming a carboxylic acid compound of the group of

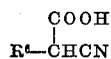

indene - 3 - carboxylic acid, tricyclo[5.2.1.0$^{2,6}$]deca-3,8-diene - 4,9 - dicarboxylic acid and tricyclo[5.2.1.0$^{2,6}$]deca-3,8-diene-4,9-dicarboxylic acid or fluorene-9-carboxylic acid comprising contacting an organic reactant of

indene, cyclopentadiene, or fluorene, respectively, where $R^6$ is phenyl or alkylphenyl of from 7 to 11 carbons in the presence of a guanidine of the formula:

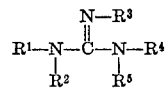

where $R^1$ through $R^5$ are as heretofore defined under substantially anhydrous conditions with carbon dioxide desirably in excess of the stoichiometric amount of a temperature between about 0 and 250° C., preferably between 25 and 100° C., under a carbon dioxide pressure of from 1 to 500 atmospheres, preferably between 50 and 200 atmospheres, utilizing a mole ratio of base to organic reactant of between about 1:1 and 20:1, preferably between 1:1 and 5:1. As a next step the reaction mixture is acidified to a pH of less than 6, preferably between about 1 and 3, and the resultant carboxylic product acid is recovered therefrom. Acidification is desirably conducted at a temperature of between about 5 and 35° C.

A liquid solvent for the reaction would normally only be required to provide liquid reaction mixture conditions for atmospheric pressure contactings. Suitable inert solvents are dimethyl sulfoxide, diphenyl sulfoxide, dimethyl sulfone and dimethylformamide.

In addition to the indene, cyclopentadiene and fluorene reactants contemplated herein are benzyl cyanide, p-methylphenylacetonitrile, p-ethylphenylacetonitrile and p-propylphenylacetonitrile.

Specific examples of the carboxylic products contemplated herein in addition to those previously mentioned are α-(p-methylphenyl)cyanoacetic acid, α-(p-ethylphenyl)cyanoacetic acid and α-(p-isopropylphenyl)cyanoacetic acid.

Specific examples of the acidifying acid contemplated herein are aqueous mineral acids of between about 4 and 96 wt. percent concentration such as hydrochloric acid, nitric acid, sulfuric acid, and oxydrobromic acid.

The carboxylic acid product is recovered by standard means such as by extraction, distillation and combinations thereof.

By the term "substantially anhydrous" water contents less than 0.5 wt. percent are intended based on the reaction mixture.

The following examples further illustrate the invention but are not to be construed as limitations thereof.

EXAMPLE I

This example illustrates the preparation of indene-3-carboxylic acid from indene.

To a glass-lined, 0.5-liter rocker bomb, there was charged 11.6 grams of indene and 11.5 grams of 1,1,3,3-tetramethylguanidine. The resultant mixture had a water content less than 0.5 wt. percent. The bomb was assembled and flushed with dry carbon dioxide and additional dry carbon dioxide was charged to an initial pressure of 800 p.s.i.g. The bomb was then rocked and heated at 98–102° C. for a 5-hour period and during that time the pressure increased to between 1000 and 1025 p.s.i.g. The bomb was allowed to cool and was vented. The reaction mixture was worked up by acidifying with cold aqueous hydrochloric acid (200 mls. conc. HCl+100 grams of ice and 100 mls. of 6 molar HCl) and the resultant acidic mixture was extracted with ether (1× 200 mls. and 5× 100 mls.). The ether extracts were combined and the combined extracts were further extracted with a 10 wt.

percent aqueous sodium bicarbonate solution (5× 100 mls.). The bicarbonate extractions were cooled in ice water bath and made acidic with 6 molar HCl which was added until a pH of 3 was obtained. The yellow solids were formed which were further extracted with ether (6× 100 mls.).

The ether solution was dried over anhydrous sodium sulfate followed by drying over anhydrous calcium sulfate. The ether was stripped off on a rotating evaporator to give a crude acidic product and the crude acidic product was recrystallized from benzene to yield 6.9 grams of indene-3-carboxylic acid, corresponding to a yield of 43.3 mole percent yield basis indene reactant. The melting point of the indene carboxylic acid was 159–161° C. (lit. 158–160° C.). A mixture melting point of the product and a sample of known pure indene-3-carboxylic acid was not depressed. The infrared and nuclear magnetic resonance spectra confirmed the presence and structure of the indene-3-carboxylic acid product.

EXAMPLE II

To a glass-lined, 0.5-liter pressure bomb, 14 grams of benzyl cyanide and 13.8 grams of 1,1,3,3-tetramethylguanidine were charged and the bomb was assembled and flushed with dry carbon dioxide. The resultant mixture had a water content less than 0.5 wt. percent. Then additional dry carbon dioxide was charged to an initial pressure of 900 p.s.i.g. The bomb was rocked and heated at 28–33° C. and at 900–950 p.s.i.g. carbon dioxide pressure for 8 hours. The resultant reaction mixture was acidified and the carboxylic product recovered in the manner described in Example I. The product weighed 0.5 gram and was identified as alpha-phenylcyanoacetic acid. The melting point of the alpha-phenylcyanoacetic acid was 91–94° C. (lit. 92° C.) and the infrared and nuclear magnetic spectra confirmed the structure.

EXAMPLE III

To a 3-necked, 100-ml., round-bottomed flask equipped with a magnetic stirrer, thermometer, gas sparger, heating mantle and condenser, the exit of the condenser being connected to a mercury bubbler, there was charged 13.2 grams of cyclopentadiene and 23 grams of 1,1,3,3-tetramethylguanidine under atmospheric pressure conditions. The resultant mixture had a water content less than 0.5 percent. Dry carbon dioxide was bubbled under atmospheric pressure into the mixture for a period of 3 hours at 29–40° C. The resultant product was acidified and worked up in accordance with Example I and 2.7 grams of tricyclo[5.2.1.0$^{2,6}$]deca - 3,8 - diene-4,9-dicarboxylic acid (Thiele's acid) representing a yield of 12.3 mole percent was obtained. The melting point of the product was 201–204° C. (lit. 204–205° C.) and an infrared spectral analysis confirmed the production of Thiele's acid.

EXAMPLE IV

To a glass-lined, 0.5-liter bomb, there was charged 26.4 grams of cyclopentadiene and 46 grams of 1,1,3,3-tetramethyl guanidine. The bomb was assembled and flushed with dry carbon dioxide. The water content in the resultant mixture was less than 0.5 wt. percent. Then additional carbon dioxide was charged to an initial pressure of 850 p.s.i.g. The mixture was rocked and heated to 73–77° C. and at 900–925 p.s.i.g. carbon dioxide pressured for five hours. The bomb was allowed to cool and vented through a trap cooled with Dry Ice—isopropyl alcohol. The resultant reaction mixture was acidified with cold aqueous HCl (200 mls. of con. HCl+ 200 mls. of water+100 g. of ice) and the acidified mixture was extracted with ether (1× 200 mls.). At this point solids formed in the ether extract and the ether extracts were filtered through a sinter glass filter, the solid residue on the filter washed several times with water, air dried, and dried in a vacuum at room temperature to give tricyclo [5.2.1$^{2,6}$]deca - 3,8 - diene - 4,9 - dicarboxylic acid (9.2 grams) representing a yield of 20.9 wt. percent. The product had a melting point of 202–208° C. and an infrared spectrum confirmed structure.

The separated aqueous layer from acidification was worked up by ether extraction (6× 150 mls.) followed by extraction of the ether with 10% aqueous sodium bicarbonate (5× 100 mls.) and acidification of the sodium carbonate extracts with dilute hydrochloric acid to a pH of about 3 to give a second solid in the form of a precipitate having a weight of 7 grams. The second solid precipitate was tentatively identified as tricyclo[5.2.1.0$^{2,6}$]deca-3,8-diene-5,-dicarboxylic acid representing a yield of 15.9 wt. percent of the cyclopentadiene reactant. The infrared spectral analysis of the second precipitate confirmed the structure.

EXAMPLE V

This example illustrates the criticality of the particular combinations of reactants defined herein. Four runs were conducted in which the reactant or base material was substituted with substances closely related to the reactant or base contemplated herein. In Runs A and C the overall procedure was that as essentially described in Example III. In Run B the overall procedure was that essentially described in Example IV. The water content in the initial reaction mixture was less than 0.5 wt. percent.

TABLE I

| React. cond. 2nd results | A | B | C |
|---|---|---|---|
| Base | [1] TMG | [2] IRA–400 | NaOH. |
| Moles base | 0.12 | 0.06 | 0.24. |
| Reactant | Phenylacetylene | Indene | Indene. |
| Moles of reactant | 0.03 | 0.06 | 0.12. |
| CO temp., ° C | 100–102 | 46–51 | 31–60. |
| CO$_2$ react. time, hrs | 4 | 8 | 2. |
| CO$_2$ pressure, p.s.i.g | | 975–1,000 | |
| COOH derivative, percent yield. | None | None | None. |

[1] 1,1,3,3-tetramethylguanidine.
[2] Polystyrene quaternary amine.

As can be seen from the foregoing table, variations in either closely related organic reactants or base fails to result in the production of a carboxylic acid derivative under the contemplated conditions indicating the criticality of the particular combination of the claimed invention.

I claim:
1. A method of producing a cyanoacetic acid of the formula:

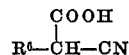

comprising containing R$^6$CH$_2$CN with carbon dioxide under a carbon dioxide pressure of between about 1 and 500 atmospheres in the presence of a base of the formula:

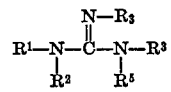

and under substantially anhydrous conditions at a temperature between about 0 and 250° C. utilizing a mole ratio of base to organic reactant between about 1:1 and 20:1, acidifying the resultant mixture to a pH of less than 6 and recovering the carboxylic acid therefrom, said R$^1$ through R$^5$ being hydrogen or alkyl of from 1 to 5 carbons and said R$^6$ being phenyl or alkylphenyl of from 7 to 11 carbons.

2. A method in accordance with claim 1 wherein said $R^6$ is phenyl, said base is 1,1,3,3-tetramethyl guanidine, said carbon dioxide pressure is between about 50 and 200 atmospheres, said temperature is between about 25 and 100° C., said pH is between about 1 and 3 and said acidifying acid is aqueous hydrochloric acid.

3. A method in accordance with claim 1 wherein said acidifying is conducted to a pH of between about 1 and 3.

4. A method in accordance with claim 2 wherein said acidifying acid is aqueous hydrochloric acid.

References Cited
UNITED STATES PATENTS 3,346,622  10/1967  Selwitz et al. _____ 260—465 X ELBERT L. ROBERTS, Primary Examiner D. H. TORRENCE, Assistant Examiner U.S. Cl. X.R.

260—514 C, 515 R

UNITED STATES PATENT OFFICE
CERTIFICATE OF CORRECTION

Patent No. 3,793,364                    Dated February 19, 1974

Inventor(s) EDWIN L. PATMORE

It is certified that error appears in the above-identified patent and that said Letters Patent are hereby corrected as shown below:

Col. 4, Table I, line 31, "React. cond. 2nd results" should read --React. cond. and results--.

Col. 4, Table I, line 35, "CO" should read --$CO_2$--.

Col. 4, Claim 1, lines 62-65, $$"R^1-N - \underset{R^5}{\underset{|}{C}}-R^3"$$
with $\overset{N-R_3}{\underset{}{\|}}$ above C, and $R^2$ below N should read $$-- R^1-N - \underset{R^5}{\underset{|}{C}}-R^4 --$$
with $\overset{N-R^3}{\underset{}{\|}}$ above C, and $R^2$ below N.

Signed and sealed this 16th day of July 1974.

(SEAL)
Attest:

McCOY M. GIBSON, JR.                C. MARSHALL DANN
Attesting Officer                   Commissioner of Patents